Figure 1:
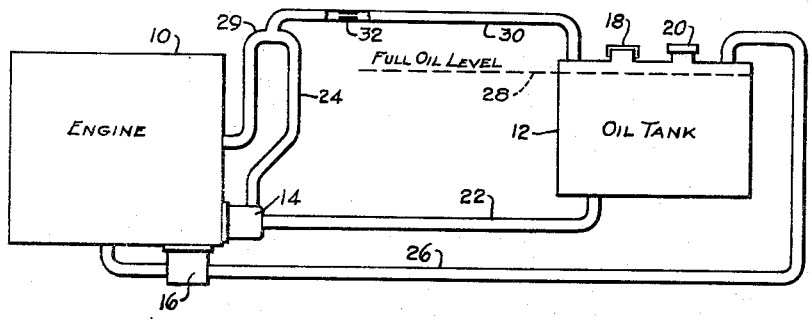

July 31, 1951   C. S. JEWETT ET AL   2,562,722
LUBRICATION SYSTEM
Filed Jan. 3, 1949

INVENTORS
CHARLES S. JEWETT.
JOSEPH MODROVSKY.
BY
ATTORNEY

Patented July 31, 1951

2,562,722

UNITED STATES PATENT OFFICE 2,562,722

LUBRICATION SYSTEM

Charles S. Jewett, Ramsey, N. J., and Joseph Modrovsky, Flushing, N. Y., assignors to Wright Aeronautical Corporation, a corporation of New York Application January 3, 1949, Serial No. 68,844

12 Claims. (Cl. 184—6)

This invention relates to lubrication systems and is particularly directed to a lubrication system for an engine.

In conventional dry-sump lubrication systems, particularly as provided for aircraft engines, the engine lubricating oil is stored in a supply tank from which it is supplied to the various engine bearing surfaces by a pump. This oil pump is generally driven by the engine and therefore is disposed on or in the engine while the oil supply tank is disposed at some distance from said pump. In order to insure a positive head of oil at the inlet of the oil pump, it is customary to install the oil supply tank so that its oil level is always above the inlet to said pump to such an extent that oil flow to said pump inlet is assured even when the engine is started in cold weather. With this arrangement, oil tends to leak under gravity into the engine from the oil supply reservoir when the engine is shut down. To prevent such leakage of oil into the engine, it is customary to provide a valve in the oil line between the oil pressure pump and the engine bearing surfaces. This valve is provided with a spring for holding it closed against the head of oil in the supply tank but when the oil pump is driven by the engine the pump output oil pressure is sufficient to open the valve against said spring. This construction is dangerous because upon starting the engine the oil pressure pump must first provide sufficient oil pressure to open said valve before there is any flow of oil to the engine bearing surfaces. In addition, in the case of an aircraft installation, the supply of oil to the pump inlet may be momentarily interrupted as a result of maneuvering of the aircraft whereupon the resulting output gas pressure of the oil pump is insufficient to hold the valve open and this gas pressure tends to blow back between the pump clearances to the inlet side of the pump thereby making it difficult for the oil pump to reprime itself.

An object of the invention comprises an improvement of this engine lubrication system wherein the aforementioned spring loaded valve between the oil pressure pump and the engine bearing surfaces is eliminated. A further object of the invention comprises the provision of an engine lubrication system in which the oil flow path between the oil tank and the engine bearing surfaces is continuously open except for the restriction provided by the oil pump itself and, even though the level of the oil in the oil supply tank is above that of at least some of the bearing surfaces of the engine, leakage of oil into the engine through said flow path, when the engine is shut down, is prevented.

In accordance with the invention, some portion in the oil flow path between the oil pressure pump and the engine bearing surfaces is disposed above the level of the oil in the oil supply tank so that the only way oil can drain into the engine from said tank is by a siphoning action of the oil over this high portion in the oil pressure passage between the oil pressure pump and the engine bearing surfaces. Said oil pressure passage is provided, however, with an opening or vent at its said high portion to admit air or other gas therein when the engine is shut down thereby effectively preventing any such siphoning action.

Figure 2:
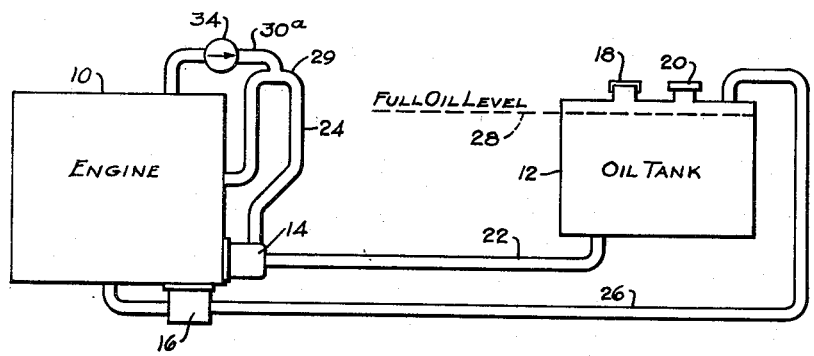

Other objects of the invention will become apparent upon reading the annexed detailed description in connection with the drawing in which:

Figure 1 is a schematic view illustrating an engine having a lubrication system embodying the invention; and Figure 2 is a view similar to Figure 1 but illustrating a modified lubrication system.

Referring first to Figure 1 of the drawing, an engine is schematically indicated at 10. The lubrication system for the engine comprises an oil tank 12, an engine driven oil pressure pump 14, and an engine driven scavenge pump 16. The oil tank 12 is conventional and includes a filler cap 18 and may be vented back into the engine crankcase, as is conventional practice, or said tank may be vented through a pressure relief valve schematically indicated at 20. This tank may be installed within the engine casing or at some distance from the engine. The outlet of the tank 12 is connected to the inlet of the oil pressure pump 14 by a passageway 22 and a passageway 24 connects the outlet of the pump 14 to various bearing surfaces of the engine to be supplied with lubricating oil under pressure by the pump 14. The engine driven scavenge pump 16 returns the oil from the engine to the oil tank 12 through a passageway 26. An oil cooler (not shown) is usually interposed in one of said passageways for cooling the oil before it is returned to the engine bearing surfaces.

In order to insure a supply of oil to the inlet of the oil pressure pump 14, the oil tank 12 and pump 14 are located so that the full oil level 28 of said tank is above the inlet of said pump and preferably so that the outlet of said tank is disposed above said pump inlet. With this arrangement, the full oil level of the tank 12 is generally above at least some of the bearing surfaces of the engine supplied with lubricating oil by the pump 14 through the passageway 24. Except for the shape of the passageway 24, as illustrated in the drawing, the lubrication system so far described is conventional.

In order to prevent lubricating oil from draining from the oil tank 12 into the engine through the engine bearing surfaces, when the engine is shut down, the passageway 24 is provided with a high portion 29 disposed above the full oil level 28 of the tank 12. With this arrangement oil can drain into the engine from the oil tank 12 only as a result of a siphoning action of the oil over the high portion 29 of the passageway 24.

A vent or passageway 30 is connected to the high portion 29 of the passageway 24 so as to interrupt any siphoning action of oil over this high portion when the engine is shut down. As illustrated in Figure 1, one end of the passageway 30 opens into the oil tank 12 above the level of the oil in said tank while the other end of said passageway communicates with the passageway 24 at its high portion 29. With the addition of the vent or passageway 30, a portion of the oil delivered by the oil pressure pump 14 is returned directly to the oil tank 12 through said passageway 30. Accordingly, the size of the passageway 30 is preferably restricted so that it is small enough to limit the oil flow therethrough to a practical minimum (preferably to less than 2% of the total oil delivered by the pump 14) and yet is large enough to permit oil flow therethrough without becoming clogged. A conduit having an internal diameter of approximately .05 inch would be suitable for the passageway 30, or in lieu of a conduit of this small size a larger conduit having a restricted orifice 32 could be used.

With this construction of the lubrication system, the walls of the flow path for the oil from the oil tank 12 to the engine bearing surfaces are closed except for the vent provided by the passageway 30 at the high portion 29 of the passageway 24. When the engine is operated, a small amount of oil is returned directly to the oil tank through the restricted passageway 30. When the engine is shut down oil is no longer forced through the oil passageways 22 and 24 to the engine bearing surfaces. Therefore, when the engine is shut down, the oil in passageways 22 and 24 tends to fall, under the influence of gravity, to the lowest available level. The oil in the passageway 24 on the engine side of the high portion 29 of said passageway drains into the engine out between the engine bearing surfaces. In the absence of the vent or passageway 30, the walls of the oil path to the engine bearing surfaces would be closed all the way back to the oil tank 12 so that this oil draining into the engine would siphon oil from the oil tank 12. However, as soon as oil drains into the engine through the passageway 24 from its high portion 29, air enters this passageway 24 at its high portion 29 through the passageway 30 thereby preventing any such siphoning action. Therefore, the oil in the passageway 24, on the engine side of its high portion 29, simply drains into the engine while the oil in the passageway 24 on the other side of said high portion runs back into the oil tank through the oil pump 14 and passageway 22 until it attains the same level as the oil in said tank. In this way, although the level of the oil in the tank 12 is above at least some of the bearing surfaces of the engine and although the engine bearing surfaces are in continuous communication with the oil tank 12 through the passageways 22 and 24 and the pump clearances, oil cannot leak out of the tank 12 into the engine when said engine is shut down.

It is not necessary for the high portion 29 of the oil pressure passageway 24 to be vented back into the top of the oil tank 12. For example, instead of venting the high portion 29 of the oil pressure passageway 24 into the oil tank 12 it may be vented into the engine casing. Such an arrangement is illustrated in Figure 2 in which the parts corresponding to those of Figure 1 have been indicated by like reference numerals. In Figure 2, a passageway 30a replaces the passageway 30 of Figure 1, said passageway 30a having one end opening into the engine casing with its other end opening into the passageway 24 at its high portion 29. The open end of the passageway 30a in the engine casing must obviously be disposed above the level of any adjacent oil in said casing in order that air or other gas is admitted from the engine casing through the passageway 30a into the oil pressure passageway 24 when the engine is shut down. The operation of the lubrication system of Figure 2 is obviously similar to the aforedescribed operation of Figure 1. During engine operation the oil flowing through the vent passageway 30a into the engine casing drains down therein and is returned by the scavenge pump 16 back to the oil tank 12, together with oil draining from the engine bearing surfaces.

The circulation of oil through the passageway 30 of Figure 1 or the passageway 30a of Figure 2, during engine operation, may be prevented by interposing a check valve in each of these passageways. Such a check valve is indicated at 34 in Figure 2, said valve being arranged to close to prevent oil flow through the passageway 30a into the engine casing and to open to permit air or other gas to flow in the reverse direction (as indicated on the drawing by the arrow on said valve) into the oil pressure passageway 24 to interrupt any siphoning action of oil over the high portion 29 of this passageway 24 when the engine is shut down. Because the check valve 34 is designed to prevent oil flow through its passageway 30 or 30a, when provided with such a check valve these passageways could open directly into the atmosphere. With this latter arrangement, however, if the check valve 34 should not close properly, oil would spill therethrough into the atmosphere during engine operation. Accordingly, even if a check valve 34 is provided in the passageway 30 or 30a, said passageways are preferably connected into the oil tank or engine casing, respectively, as illustrated.

There is always a possibility that the check valve 34 might stick closed thereby rendering it ineffective to prevent siphoning action of oil over the high portion 29 of the passageway 24 when the engine is shut down. For this reason and in order to avoid any unnecessary complication, it is considered preferable to omit any such check valve from the passageway 30 or 30a.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an engine: a lubrication system for said engine comprising an oil supply tank; an oil pump arranged to be driven by said engine; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; and a vent passageway communicating with said second passageway at said high portion.

2. In combination with an engine: a lubrication system for said engine comprising an oil supply tank; an oil pump arranged to be driven by said engine; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; and a third passageway communicating with said second passageway at said high portion for admitting a gaseous fluid therein, when said oil pump stops, to prevent siphoning of oil over said high portion.

3. In combination with an engine: a lubrication system for said engine comprising an oil supply tank; an oil pump arranged to be driven by said engine; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; a third passageway communicating with said second passageway at said high portion for admitting a gaseous fluid therein, when the engine stops, to prevent siphoning of oil over said high portion; and a check valve in said third passageway to prevent oil flow therethrough from said high portion.

4. In combination with an engine: a lubrication system for said engine comprising an oil supply tank; an oil pump arranged to be driven by said engine; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; and a third passageway communicating at one end with the upper portion of said tank above the oil therein and communicating at its other end with said second passageway at said high portion.

5. In combination with an engine having a casing: a lubrication system for said engine comprising an oil supply tank; an oil pump arranged to be driven by said engine; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; and a third passageway opening at one end into the casing of said engine and opening at its other end into said second passageway at said high portion.

6. In combination with an engine: a lubrication system for said engine comprising an oil supply tank, said tank being disposed so that its full oil level is above at least one of the bearing surfaces of said engine to be lubricated by oil from said tank; an oil pump arranged to be driven by said engine and having its inlet disposed below the full oil level of said tank; a first passageway connecting the outlet of said tank to the pump inlet; a second passageway connecting the pump outlet with bearing surfaces of said engine, said second passageway having a high portion disposed upstream of said bearing surfaces and disposed above the full oil level of said tank; and a third passageway communicating with said second passageway at said high portion for admitting a gaseous fluid therein, when said oil pump stops, to prevent any siphoning of oil over said high portion.

7. In combination with an engine: a lubrication system for said engine comprising an oil supply tank, said tank being disposed so that its full oil level is above at least one of the bearing surfaces of said engine to be lubricated by oil from said tank; an oil pump arranged to be driven by said engine and having its inlet disposed below the full oil level of said tank; a first passageway connecting the outlet of said tank to the pump inlet; a second passageway providing continuous communication between the pump outlet and bearing surfaces of said engine, said second passageway having a high portion disposed upstream of said bearing surfaces and disposed above the full oil level of said tank; and a third passageway communicating at one end with the upper portion of said tank above the full oil level of said tank and communicating at its other end with said second passageway at said high portion.

8. In combination with an engine having a casing: a lubrication system for said engine comprising an oil supply tank, said tank being disposed so that its full oil level is above at least one of the bearing surfaces of said engine to be lubricated by oil from said tank; an oil pump arranged to be driven by said engine and having its inlet disposed below the full oil level of said tank; a first passageway connecting the outlet of said tank to the pump inlet; a second passageway providing continuous communication between the pump outlet and bearing surfaces of said engine, said second passageway having a high portion disposed upstream of said bearing surfaces and disposed above the full oil level of said tank; and a third passageway opening at one end within the engine casing and opening at its other end into said second passageway at said high portion.

9. In combination with an engine: a lubrication system for said engine comprising an oil supply tank, said tank being disposed so that its full oil level is above at least one of the bearing surfaces of the engine to be lubricated with oil from said tank; an oil pump arranged to be driven by said engine and having its inlet disposed below the oil outlet of said tank; a first passageway connecting the outlet of said tank to the pump inlet; a second passageway providing continuous communication between the pump outlet and bearing surfaces of said engine, said second passageway having a high portion disposed upstream of said bearing surfaces and disposed above the full oil level of said tank; and a third passageway communicating with said second passageway at said high portion for admitting a gaseous fluid therein, when the engine stops, to prevent siphoning of oil over said high portion.

10. In combination with an engine: a lubrication system for said engine comprising an oil supply tank, said tank being disposed so that its full oil level is above at least one of the bearing surfaces of said engine to be lubricated by oil from said tank; passage means providing communication between said tank and bearing surfaces of said engine; an oil pump disposed in said passage means for pumping oil from said tank to said bearing surfaces; said passage means having a high portion disposed above the full oil level of said tank; and a passageway communicating with said passage means at said high portion for admitting a gaseous fluid therein, when said oil pump stops, to prevent any siphoning of oil over said high portion.

11. In combination with an engine: a lubrication system for said engine comprising an oil supply tank, said tank being disposed so that its full oil level is above at least one of the bearing surfaces of said engine to be lubricated by oil from said tank; an oil pump having its inlet disposed below the full oil level of said tank; a first passageway connecting the outlet of said tank to the pump inlet; a second passageway connecting the pump outlet with bearing surfaces of said engine, said second passageway having a high portion disposed above the full oil level of said tank; and a third passageway communicating with said second passageway at said high portion for admitting a gaseous fluid therein, when said oil pump stops, to prevent any siphoning of oil over said high portion.

12. In combination with an engine: a system for supplying a liquid to said engine; said system comprising a supply tank for said liquid, said tank being disposed so that its full liquid level is above a point of discharge of said liquid into said engine; a liquid pump having its inlet disposed below said full liquid level; a first passageway connecting an outlet of said tank to the pump inlet; a second passageway connecting the pump outlet with a point of discharge of said liquid into said engine, said second passageway having a high portion disposed above said full liquid level; and a third passageway communicating with said second passageway at said high portion for admitting a gaseous fluid therein, when said pump stops, to prevent any siphoning of liquid over said high portion.

CHARLES S. JEWETT.
JOSEPH MODROVSKY.

REFERENCES CITED

The following references are of record in the file of this patent:

UNITED STATES PATENTS

| Number | Name | Date |
|---|---|---|
| 2,322,463 | McDonald | June 22, 1943 |

FOREIGN PATENTS

| Number | Country | Date |
|---|---|---|
| 419,515 | France | Jan. 9, 1911 |
| 104,666 | Great Britain | Mar. 15, 1917 |
| 486,389 | Great Britain | June 2, 1938 |